United States Patent [19]

Arnold et al.

[11] 4,365,301

[45] Dec. 21, 1982

[54] POSITIONAL REFERENCE SYSTEM FOR ULTRAPRECISION MACHINING

[75] Inventors: Jones B. Arnold, Knoxville; Robert R. Burleson, Clinton; Robert M. Pardue, Knoxville, all of Tenn.

[73] Assignee: The United States of America as represented by the United States Department of Energy, Washington, D.C.

[21] Appl. No.: 186,869

[22] Filed: Sep. 12, 1980

[51] Int. Cl.³ .................... G06F 15/46; G01B 11/02
[52] U.S. Cl. .................................... 364/475; 82/2 B; 318/640; 356/358; 364/560; 364/167
[58] Field of Search ............... 364/474, 475, 167–171, 364/559–562, 525; 235/92 MP; 33/1 M, DIG. 4, DIG. 21; 116/230–232; 82/1 R, 1 C, 2 B, 21 B; 318/640, 652; 356/345, 355–358

[56] References Cited

U.S. PATENT DOCUMENTS

| | | | |
|---|---|---|---|
| 3,708,657 | 1/1973 | Kelling | 235/92 MP |
| 3,779,647 | 12/1973 | Dawson | 356/358 X |
| 3,786,332 | 1/1974 | Hepner et al. | 318/640 X |
| 3,812,376 | 5/1974 | Takeyama et al. | 356/357 X |
| 3,884,580 | 5/1975 | Webster et al. | 356/358 |
| 4,221,995 | 9/1980 | Barkman | 318/640 X |

*Primary Examiner*—Joseph F. Ruggiero
*Attorney, Agent, or Firm*—David E. Breeden; Stephen D. Hamel; Richard G. Besha

[57] ABSTRACT

A stable positional reference system for use in improving the cutting tool-to-part contour position in numerical controlled-multiaxis metal turning machines is provided. The reference system employs a plurality of interferometers referenced to orthogonally disposed metering bars which are substantially isolated from machine strain induced position errors for monitoring the part and tool positions relative to the metering bars. A microprocessor-based control system is employed in conjunction with the plurality of position interferometers and part contour description data inputs to calculate error components for each axis of movement and output them to corresponding axis drives with appropriate scaling and error compensation. Real-time position control, operating in combination with the reference system, makes possible the positioning of the cutting points of a tool along a part locus with a substantially greater degree of accuracy than has been attained previously in the art by referencing and then monitoring only the tool motion relative to a reference position located on the machine base.

7 Claims, 7 Drawing Figures

POSITIONAL REFERENCE SYSTEM FOR ULTRAPRECISION MACHINING

BACKGROUND OF THE INVENTION

This invention relates generally to interferometer-based position control systems and more particularly to a positional reference system for ultraprecision, numerical controlled machining. The invention is a result of a contract with the U.S. Department of Energy.

In the art of ultraprecision machining by means of single point tool turning processes using multiaxis turning machines, positioning of the tool cutting edge along a numerically defined part loci is accomplished by error position signal generation determined by monitoring the deviation of the tool edge from a command path along the part loci from numerical part description data. Laser interferometers have been employed as the most accurate means of monitoring the tool position in various error signal generating feedback control arrangements. However, the laser interferometer still requires determining the tool position by relative displacement of the tool holder along the respective axis of movement from known reference points.

It has been the practice to locate reference points or stations as rigid mounts to the machine base. Because of rotations and strain (resulting from heat and forces), the relative motions between the tool and the reference points on the slides introduce significant errors in positioning for ultraprecision machining. The same is true for relative motions between the part and the reference points on the machine base. Thus, there is a need for a positional reference system which overcomes these problems in order to improve the positional accuracy of the tool along the commanded part contour in ultraprecision machining.

SUMMARY OF THE INVENTION

In view of the above need it is an object of this invention to provide a positional reference system for improving the position accuracy in ultraprecision positioning systems.

Another object of this invention is to provide a laser interferometer based positional-reference system for use in numerical controlled machines which is insensitive to machine-related stresses.

Yet another object of this invention is to provide a laser-interferometer-based positional-reference system as in the above objects which provides stable referencing of numerical controlled machine tool cutting points relative to a part being machined.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein in combination with a numerical controlled machining system, a positional reference system is provided. The machining system includes a spindle, a cutting tool holder for holding a cutting tool with the cutting edge at a predetermined fixed location relative to the holder, a cross slide means for moving the cutting tool holder reversably along an X axis and an axial slide means for moving one of the spindle and the cross slide means reversably along a y axis. The positional reference system of this invention may comprise a metering bar assembly including x and y coordinate reference flats disposed parallel to the x and y axis slides of the machine. A mounting plate may be carried by the spindle for supporting a workpiece to be rotated about an axis parallel to the machine y axis. A plurality of interferometers may be provided for monitoring the displacement of the tool holder and the workpiece mounting plate with reference to the x and y coordinate of the metering bar assembly. Control means responsive to the outputs of said plurality of interferometers and workpiece machining contour description data is employed for generating x and y axis position error signals and applying them to the cross slide means and the axial slide means, respectively, so that the cutting tool is moved relative to the workpiece to machine the workpiece according to a programmed contour. Both the tool and workpiece are position referenced to the stable metering bar assembly x-y coordinates.

The metering bar assembly x-y coordinate reference provides precise location of both the tool and the workpiece relative to the reference coordinates and thus eliminates errors encountered in conventional interferometer displacement monitoring systems wherein the displacement is monitored along each axis slide with reference to the machine base. Errors due to slide rotation, and machine base strain due to heat and forces are eliminated by isolating the thermally stable metering bar assembly from the machine base forces.

BRIEF DESCRIPTION OF THE DRAWINGS

The accompanying drawings, which are incorporated in and form a part of the specification, illustrate the present invention and, together with the description, serve to explain the principles of the invention.

In the drawings.

DETAILED DESCRIPTION

Figure 1:
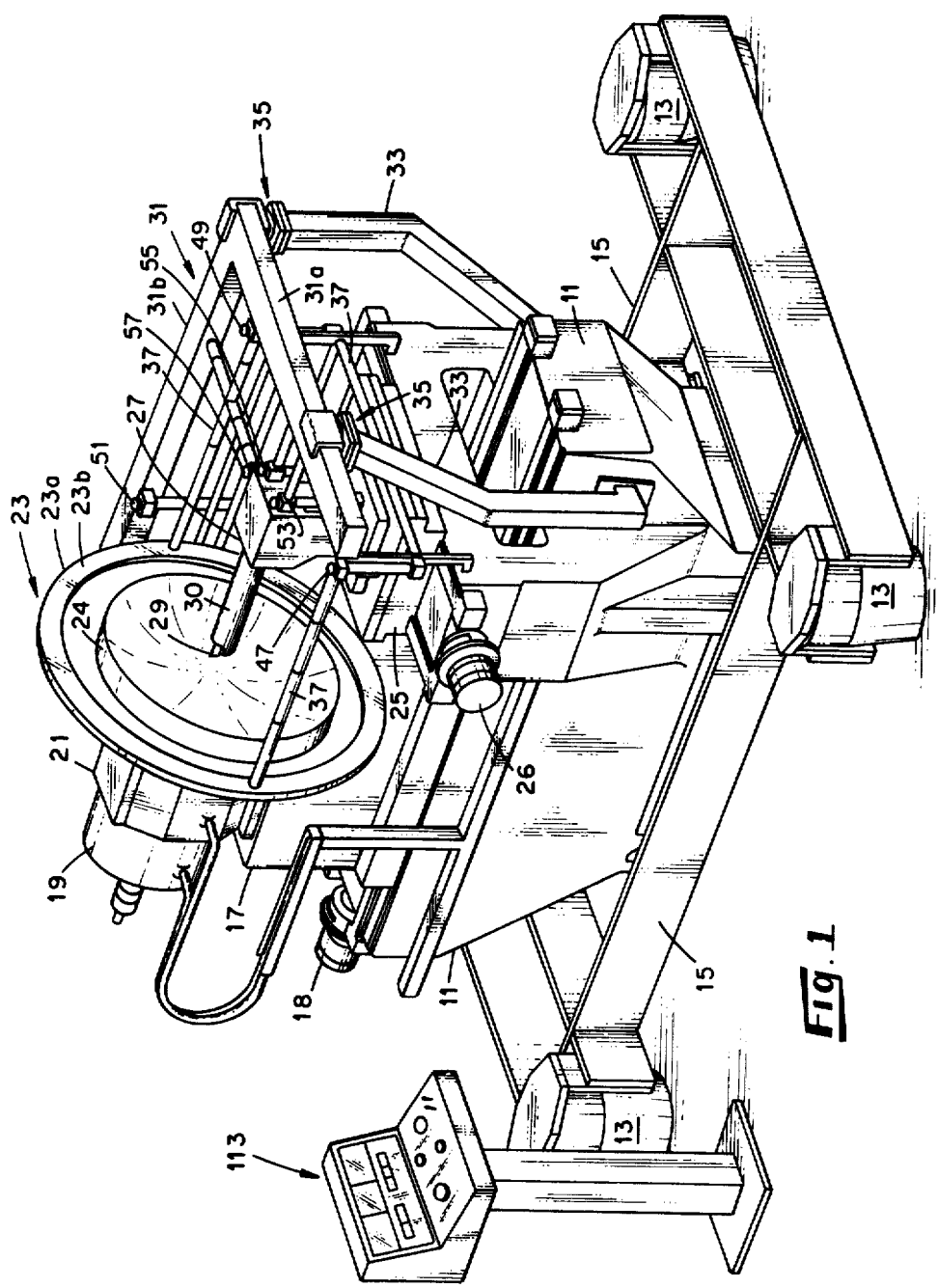
FIG. 1 is a perspective view of a turning machine employing the positional referencing system according to the present invention.

Referring now to FIG. 1, a typical machine arrangement comprises a base configuration 11 mounted on conventional vibration isolators 13 by means of a rigid frame work 15, an axial slide 17 which carries the spindle drive motor 19, air bearing 21 and the spindle 23 which carries the workpiece 24, and a cross slide 25 which carries a tool holder 27 and cutting tool 29. The slides 17 and 25 are driven by means of error signals applied to the slide motor drives 18 and 26, respectively.

A metering bar assembly 31 is provided consisting of two, high-quality optical flats 31a and 31b defining an x-y coordinate reference system. The optical flats may be constructed of a thermally stable ceramic such as optical grade glass. The reference surface of each bar is of high optical quality with a pitch polish finish >80/50 scratch/dig. ratio and an overall peak-to-rally figure quality >0.5 ppm (with slope errors not to exceed 1$\mu$ in/in.). Extremely high figure quality is not required since the slope errors are predetermined and compensation is made during machining operations.

The bars 31a and 31b are disposed at a 90° angle with respect to each other and supported by three support brackets 33 to form the x-y coordinate references. Conventional three-ball supports 35 are used to mount the metering bar assembly 31 on the support brackets 33 to minimize forces which might otherwise be transmitted through the support brackets 33 to distort the position of the assembly 31 from its reference orientation. Other support assemblies may be used. However, the primary requirement for the support system is that external influences not be transmitted into the bars.

The various interferometer laser beams may be directed through appropriately disposed tubes 37 to permit control of the atmosphere through which a substantial portion of the various beams pass. Since the wavelength of a laser beam varies depending upon the temperature, pressure and humidity of the medium through which it passes, control of the atmosphere through which the beams pass is highly desirable.

The beam tubes may be vacuum sealed with beam passage lens in the tube ends and evacuated. Alternatively they may be held at constant temperatures and pressure by passing a controlled temperature gas through the tubes at a selected flowrate to maintain a relatively constant pressure in the tubes. Telescoping tube sections may be used to allow movement of the spindle and tool holder along their respective axis. The tube system also may be used to support the various optical components, such as beam benders, splitters, interferometers, etc.

Figure 2:
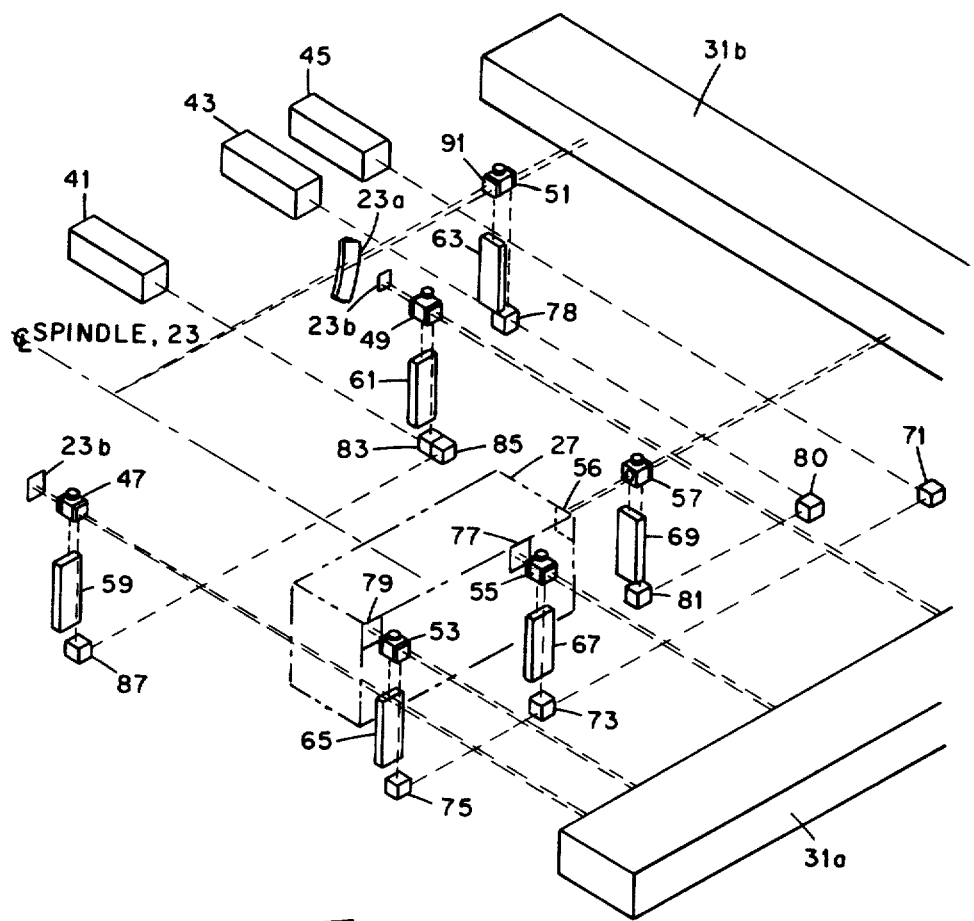
FIG. 2 is a schematic diagram of the various interfereometer beam paths and their relative orientation in the optical referencing system.

Referring now specifically to FIG. 2 there is shown schematically, for a clearer understanding of the positional referencing system, the metering bars (31a and 31b), portions of the spindle 23 and tool holder 27 (shown in phantom) from which the interferometer measurements are made to obtain the part and tool location, and the multiple interferometer position measuring system. Three dual beam laser sources (41-45) are provided for six interferometers (47-57) required to obtain the proper positional information to monitor the position of the tool on the tool holder 27 and the part or workpiece 24 mounted on the spindle 23. Each interferometer has a corresponding receiver, receivers 59-69, for detecting the fringes generated by the corresponding interferometers and generates corresponding output count signals which are counted by counters in a feedback control circuit described hereinbelow. The interferometers 47-57 are preferably specially designed double pass interferometers with enhanced resolution by direct measurement of relative motion of opposed surfaces. These interferometers measure the motion of the tool holder or spindle by aligning the interferometer between mirror surfaces on the tool holder or spindle and the appropriate metering bar plane mirror edge surface. The interferometers are insensitive to movement of the interferometer head itself since they measure the relative motion between the opposed surfaces. Additional details of the interferometers may be had by referring to U.S. Pat. No. 4,334,778, application Ser. No. 186,870 filed Sept. 12, 1980, for "Dual Surface Interferometer" by R. M. Pardue et al. and filed on the same date with the present application.

The laser source 45 beam is directed through a 90° beam bender 71 to a beam splitter 73 which directs a portion of the beam to interferometer 55 and the remainder of the beam to a 90° beam bender 75 which directs the beam into interferometer 53. Mirrors 77 and 79 mounted on the tool holder at a known orientation from the tool tip (not shown in FIG. 2) provide the reflection surfaces for the interferometers 55 and 53, respectively. The opposing surface is the inner mirror edge of the metering bar 31a. The beam splitter 73, bender 75, interferometer 55 and 57, and receivers 65 and 67 are carried by the x axis slide to move with the tool holder 27.

The beam from the laser source 43 is directed through a beam splitter 78 which directs a portion of the beam to interferometer 51 which determines the displacement of the spindle edge 23a relative to the inner edge of the metering bar 31b along the x axis. The interferometer 51, splitter 78, and receiver 63 are carried by the y axis slide to maintain alignment with the spindle edge 23a. The undeflected portion of the beam from source 43 is directed through 90° beam benders 80 and 81 to interferometer 57 which measures the relative displacement of the tool holder 27 along the X axis from the inner edge of the metering bar 31b. A mirror surface 56 is mounted on the tool holder for interferometer 57.

The beam from source 41 is directed into a beam splitter 83 from which a portion of the beam is directed into interferometer 49 and the undeflected portion is directed through 90° beam benders 85 and 87 into interferometer 47. Interferometers 47 and 49 measure the relative displacement of a mirror finished annular ring face portion 23b at the periphery of the spindle at diametrically opposite points on the spindle face.

The various interferometers oriented as shown in FIGS. 1 and 2, monitor with a high degree of accuracy the position of the tool tip and workpiece so that the tool tip may be positioned along the programmed part contour from precisely determined referenced start position for ultraprecision machining of the workpiece. The interferometers are located to determine the x and y components of displacement of points on the workpiece to be machined and points on the tool cutting edge contacting the workpiece. With the stable x-y metering bar reference system the distance between these points can be made to equal zero.

Parts to be machined are not single points, but consist of contoured surfaces which are loci in the cutting plane. A description of the position of a locus is more complex than a description of a point.

Figure 3:
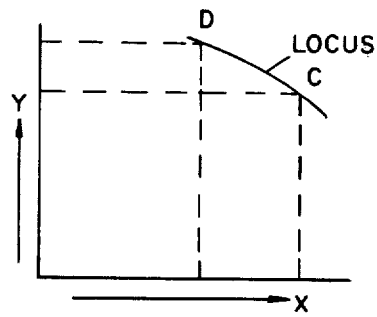
FIGS. 3 and 4 are graphs depicting ways in which locus-position description may be defined in a coordinate-reference system.
Figure 4:
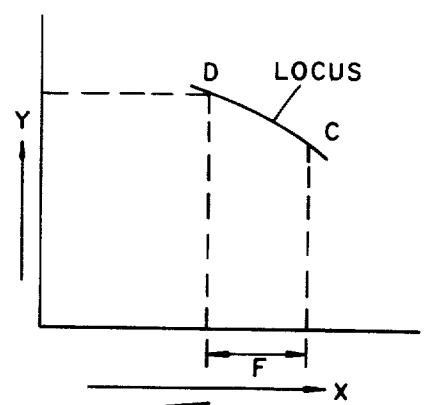

Locus-position description requires that the location of two specific points (C and D) on the locus be identified. This may be done by determining the x and y positions of the points C and D as shown in FIG. 3. The dotted lines in this figure represent known distances, and it will be seen that four distances must be known to specify the positions of the locus. However, when two of the distances, aligned in the same direction, are spaced a known distance (F) apart, as shown in FIG. 4, only three distances must be known to determine the x and y position of the two points (C and D). This concept reduces the number of lasers and interferometers needed to monitor positions of the tool and workpiece in the present system.

Neither is the tool a single point; it is a locus also. As in the workpiece positioning, it is necessary that the tool tip position also be determined with three reference dimensions.

Since neither the points along the workpiece locus nor the points along the tool tip locus may be measured directly, reference points on the workpiece spindle 23 and the tool holder 27 are provided. These points on the tool holder correspond to the positions of the mirrors for the interferometer and the mirror finished surfaces on the spindle, as described above.

Figure 5:
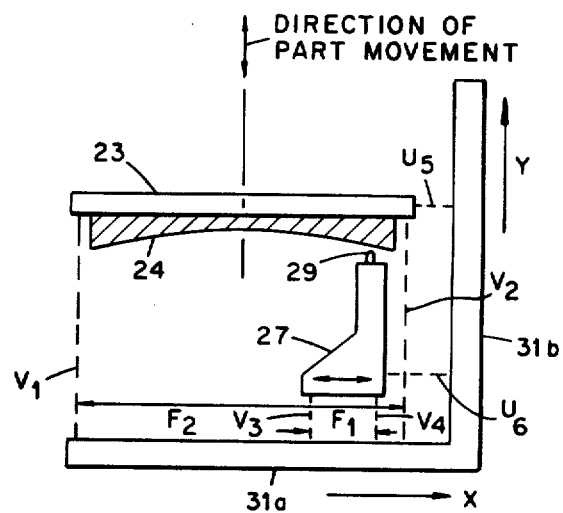
FIG. 5 is a schematic illustration of the reference system of FIGS. 1 and 2 in simplified form showing the location of the various interferometer beams and their orientation relative to the tool tip and workpiece.

FIG. 5 shows schematically the arrangement of the six interferometer beam paths (dotted lines) and the various reference dimensions (F). The reference positions on the workpiece and the tool are selected to minimize both Abbe'-offset effects (errors associated with displacement between the machining plane and the measuring plane) and the distance between the reference points and the points of interest (on the workpiece and the tool) while providing a reasonable degree of machining flexibility for various contours. When the reference points are significantly removed from the points of interest, the positional determinations of these interest points are impaired. The degree of strain (resulting from heat and forces) between reference points and points of interest on the loci are related linearly to the distances between the points, the properties of the materials, and the properties of the connections between the points. Therefore, a thermally stable and rigid material should be used in the construction of the tool holder 27 and the spindle 23.

The tool holder 27, which supports the tool 29 rigidly with respect to the three reference mirrors, may be constructed of stable cast iron with a tungsten-carbide bar 30 (FIG. 1) to fix the tool 29 to the base portion 27 of the holder. In the present arrangement the tool holder 27 is mounted on the X slide using a conventional three-ball support mount to minimize the transfer of changing forces from the X table to the tool holder base.

Like the tool holder 27 the spindle plate 23 should be formed of an inflexible structure with three reference mirrors. The spindle plate 23 may be formed of an aluminum disc with the outer edge surface 23a and the annular peripherial ridge 23b formed by coating the surface with a durable, diamond-machinable material such as electroless-plated nickel so that the mirror surfaces may be formed directly by mirror finishing the plated surfaces 23a and 23b. The spindle plate 23 may be provided with various conventional means to support a variety of parts, as by vacuum mounting, pot-fixturing, or by bolting. To allow use of the interferometer 51 (FIG. 2) to determine the relative movement of the cylindrical section of the spindle plate 23, a cylindrical lens 91 is employed. The cylindrical lens focuses the laser beam to the center of the spindle plate, as shown in FIG. 2. However, the beam is reflected from the mirrored surface edge 23a which is the reference point for position measurement along this beam path. By focusing the beam to the center of the spindle, the diameter of the spindle plate 23 may be changed without requiring relocation of the lens 91.

Figure 6:
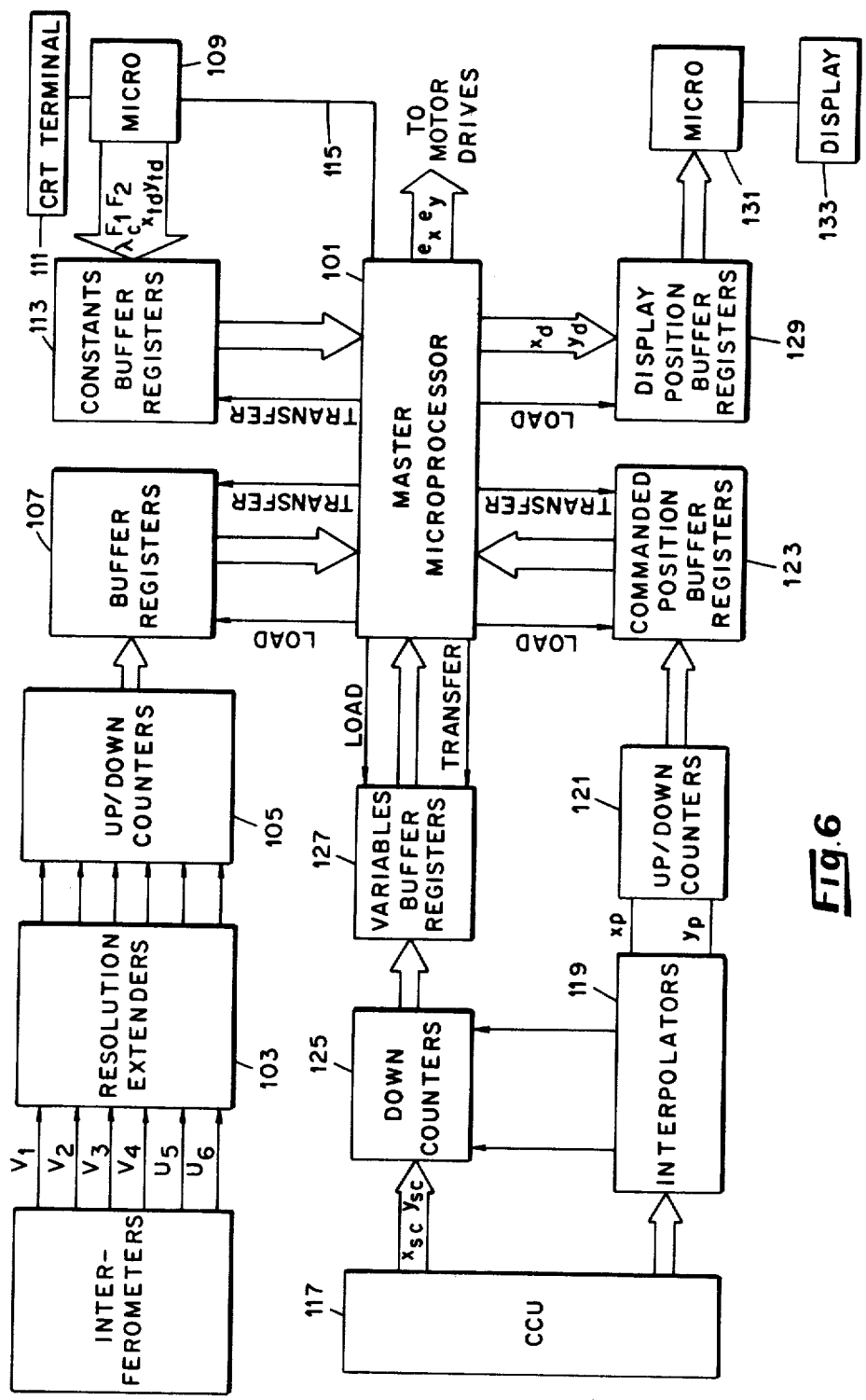
FIG. 6 is a block diagram of a microprocessor based position correction system which is used in conjunction with the position referencing system to position the machine slides.

Control of the X and Y slides of the machine is performed by calculating error signals $e_x$ and $e_y$ from programmed position commands and the position feedback data from the interferometer. The error signals are applied to the x and y axis slide drives 26 and 18, respectively. The error signals are calculated by means of a microprocessor-based position correction control system as shown in the block diagram of FIG. 6. The error signal equations are as follows:

$$e_x = (U_6 - U_5) - (V_1 - V_2)(Y_{sc}/F_2) - (V_3 - V_4)(Y_{td}/F_1) - X_p;\text{ and}$$

$$e_y = (V_1 + V_2) - (V_3 + V_4) + (V_1 - V_2)(X_{sc}/F_2) + (V_3 - V_4)(X_{td}/F_1) - Y_p$$

Assuming a maximum error of 25 nm (1 μin) may be tolerated and the machine is allowed to run at 5 mm/min. (0.2 in./min), then the update rate (R) of the error signals will be:

$$R = 5\left(\frac{mm}{min}\right)\left(\frac{1}{60}\frac{min}{sec}\right)\left(\frac{1}{25 \times 10^{-9}}\frac{Pulse}{nm}\right) = 3.3\text{ kHz.}$$

This implies that the correction system must perform the necessary error calculations and output a new error every 300 μsec to maintain a 25 nm error bound. Due to the complexity of the equations and the requirements for extreme accuracy, a bit-slice master microprocessor 101, such as the Model 2903 supplied by Advanced Micro Devices, Sunnyvale, Calif. is preferred. All variables and constants are read into the microprocessor 101 and converted to a base of 6 nm (0.25 μin), the resolution of the interferometers and the positioning system.

The variables $V_1$ through $V_4$ and $U_5$ and $U_6$, which represent the actual positions of specific points on the spindle 23 and tool holder 27 as measured by the interferometers are fed through conventional resolution extenders 103 to corresponding UP/DOWN counters 105 in a conventional interferometer pulse train processing arrangement. Displacement in the positive direction counts the counter up while reverse direction displacement counts the counter down. The net counts of the individual interferometer counters correspond to net displacement sensed by the particular interferometer in increments of λ/120, where λ is the wavelength of the laser beam. Dual frequency (helium-neon) laser sources are used. As shown in FIG. 5, the values $V_1-V_4$ represent displacements measured along the y axis and $U_5-U_6$ represent displacements along the x axis. When an update sequence is initiated by the microprocessor 101, the net counts from each of the counters 105 are loaded into corresponding channel buffer storage registers 107 for use by the microprocessor in updating the error signals.

Since the speed of light is not constant in air, but varies with temperature, pressure and humidity, a compensation for this may be performed. An auxiliary microprocessor 109 is programmed to calculate a compensated wavelength, $\lambda_c$, from the environmental conditions which may be inserted by an operator through a cathode-ray-tube (CRT) terminal 111. The CRT terminal may be located at an operator control station 113 as illustrated in FIG. 1. The compensated wavelength value is fed, along with other values, into constants buffer storage registers 113 where they are available to the master microprocessor 101 upon request. The compensated wavelength value is used to convert $\lambda$ to a base of 6 nm (0.25 μin).

The constants $F_1$ and $F_2$ (FIG. 5) are entered into the processor 109 through the CRT terminal 111. Constants $F_1$ and $F_2$ are the known x axis distances between the corresponding pairs of interferometer beams monitoring the y axis displacement of the tool holder 27 and spindle 23, respectively. These distances are determined very accurately during the interferometer alignment procedure and do not change during operations. The $F_1$ and $F_2$ values are converted by the processor 109 to the proper base units corresponding to the 6 nm interferometer base and loaded into the corresponding channel of the register 113.

Figure 7:
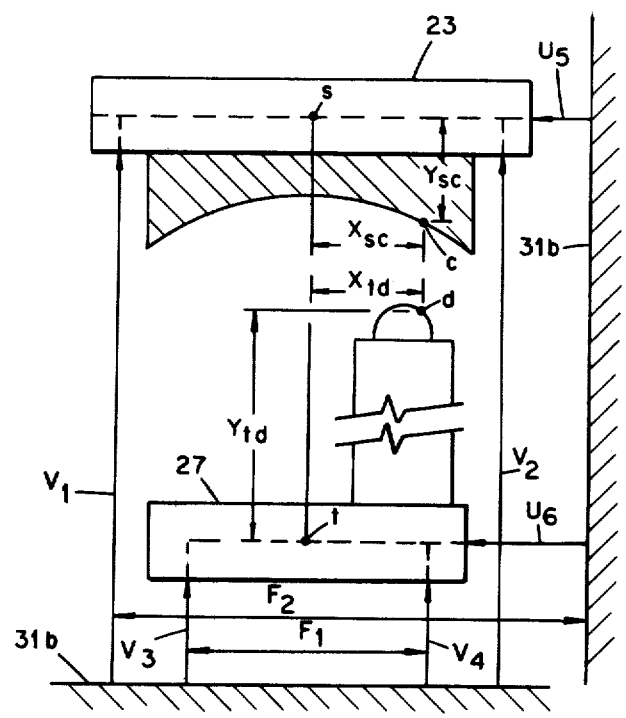
FIG. 7 is a schematic illustration of the position reference system of the present invention which shows the x and y coordinates of position relationships between points along the workpiece contour and a reference point on the workpiece spindle plate, and points on the cutting tool edge and a reference point on the tool holder.

The variable $X_{td}$ and $Y_{td}$ are the X and Y components of the distance from a point (t) in the tool holder 27, centered between the intersection of the projections of the beam $V_3$ and $V_4$ with the projection of beam $U_6$, as illustrated in FIG. 7, and a point (d) on the tool tip that contacts the workpiece at a point (c). Since the tool is not a single point which contacts the workpiece during machining but a locus of contact points along the tool cutting edge, the variables $X_{td}$ and $Y_{td}$ will change during a machining operation. These variables are computed by the microprocessor 109 from tool contour dimension data inputed to the CRT terminal. These values are updated every 0.1 degree of movement of the cutting point along the tool edge as defined by the master microprocessor 101. The master microprocessor 101 controls the auxiliary microprocessor 109 through a control line 115.

The variables $X_p$ and $Y_p$ represent the program position of each machine axis derived from part description data stored in a computer control unit 117. The part description data is fed from the control unit 117 into interpolators 119 which generate the drive command pulses ($X_p$ and $Y_p$) for both axis which are stored in UP/DOWN counters 121 in accordance with conventional practice in computer controlled command pulse generation from numerical part description data. Prior to an update sequence, the master processor 101 loads the net count from the individual axis counters 121 into commands position buffer registers 123 so that the commanded position is available for transfer under command to the master processor 101 during an update sequence.

The variables $X_{sc}$ and $Y_{sc}$ represent the x and y components of the program displacement of the tool relative to the centerline of the spindle at the tool contact points on the part. These variables are generated by the CCU 117 from the part description data and are loaded into down counters 125. The $X_{sc}$ and $Y_{sc}$ values, representing the initial tool contact position, are loaded into the corresponding channel counters 125. The counters 125 are decremented by the corresponding axis command pulses from the interpolators 119 so that the actual values of $X_{sc}$ and $Y_{sc}$ are available at all times to be loaded into buffer registers 127 just prior to an update for transfer into the microprocessor 101 at the proper command.

The variables $x_d$ and $y_d$ represent the position of the machine slides as defined by the laser-interferometer system.

$$X_d = U_5 - U_6$$

$$Y_d = \tfrac{1}{2}(V_1 - V_2) - \tfrac{1}{2}(V_3 + V_4)$$

These variables are converted from the base 6 nm to binary-coded decimal (BCD) by an auxiliary microprocessor 131 after having been outputed to display position buffer registers 129 by the master processor 101. The BCD values are fed to a display 133 located at the operator's control stand 113. The purpose of the $X_d$ and $Y_d$ display is to assist the operator in machine setup.

The position-error values $e_x$ and $e_y$ are sent to the X and Y axis drives 26 and 18, respectively. These values are calculated by the master processor 101 in accordance with the above equations and used by the drives as a measure of velocity; the larger the error, the faster the motors run.

Additional details as to the theory of operation of the system and development of the error equations may be had by reference to Oak Ridge Y-12 Plant report Y-2202, entitled "Design of a Positional Reference System for Ultraprecision Machining", available from National Technical Information Service, U.S. Department of Commerce, 5285 Port Royal Rd., Springfield, Va. 22161.

The software programs for use with this system are for preprocessing and control. The preprocessing is accomplished on a large computer system; its function is to correct the part tape for the lack of straightness in the reference flats and the contour errors of the tool. This information is then used by the control unit interpolators to form the program position $X_p$ and $Y_p$ information. The control software is run on the master microprocessor. It reads in all variables and constants from their buffers and converts them to a base of 6 nm (0.25 μin). Also performed is the conversion of the laser-interferometer data from wavelength to inches. The displayed distances $X_d$ and $Y_d$ are calculated and outputed to the auxiliary microprocessor 131. The final action is to calculate the error components ($e_x$ and $e_y$) and to output them to the motor drives after appropriate scaling. This control software runs continuously and cycles through a sequence in <150 μsec; hence, the entire system is allowed to operate at a 13 kHz bandwidth. This value keeps the system error <25 nm (1.0 μin).

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. In an automatic controlled machining system including a spindle, means for rotating said spindle, a cutting tool holder for holding a cutting tool, a cross slide means for moving the cutting tool holder reversably along an x axis and an axial slide means for moving one of the spindle and the cross slide means reversably along a y axis, a positional reference system comprising:

a metering bar assembly including X and Y coordinate reflective reference surfaces disposed parallel to the X and Y axis slides of said machining system;

a mounting plate carried by said spindle for supporting a workpiece thereon to be rotated about an axis parallel to said Y axis;

a plurality of interferometers for monitoring the displacement of said tool holder and said mounting plate carried by said spindle at predetermined points thereon relative to the points of contact of said tool with said workpiece with reference to said X and Y coordinates of said metering bar assembly; and a control means responsive to the outputs of said plurality of interferometers and workpiece machining contour description data in the form of X and Y axis components of programmed displacement of the cutting tool relative to the centerline of rotation of said spindle for generating x and y axis error signals and applying said signals to the cross slide means and the axial slide means, respectively, so that the cutting tool is positioned relative to the workpiece according to the workpiece description data with positional reference of the tool holder and the workpiece to said metering bar assembly.

2. The combination as set forth in claim 1, wherein said plurality of interferometers includes first and second interferometers disposed for measuring the displacement of said tool holder along said y-axis relative to said metering bar assembly at corresponding gauge points on said tool holder a predetermined distance $F_1$ apart along said x-axis, a third interferometer disposed to measure the displacement of said tool holder along said x-axis relative to said metering bar assembly at a predetermined axis location on said tool holder, fourth and fifth interferometers disposed for measuring the displacement of said spindle mounting plate along said y-axis relative to said metering bar assembly at points on said mounting plate a predetermined distance $F_2$ apart along said x-axis and a sixth interferometer disposed for measuring the displacement of said mounting plate along said x-axis.

3. The combination as set forth in claim 2 wherein said mounting plate carried by said spindle includes a rigid disc shaped mounting plate adapted to hold said workpiece on a front surface thereof so that said workpiece rotates about a centerline coincident with the centerline of rotation of said mounting plate, said mounting plate having an annular mirrored surface portion adjacent the periphery of said front surface to provide a gauging surface thereon for said fourth and fifth interferometers and a mirrored edge portion surrounding said plate to provide a mirrored gauging suface for said sixth interferometer so that points of contact (c) of said cutting tool on the programmed cutting contour of said workpiece are referenced to a reference point (s) in said spindle plate defined by the intersection of the projections of the beam paths of said fourth and sixth interferometers and the beam paths of said fifth and sixth interferometers.

4. The combination as set forth in claim 3 wherein said cutting tool holder includes means for rigidly supporting said cutting tool at a predetermined location relative to a fixed reference point (t) in said tool holder, said reference point (t) being located midway between the projected intersections of said first and third interferometer beams and said second and third interferometer beams directed onto said tool holder.

5. The combination as set forth in claim 4 wherein said control means includes a microprocessor means programmed for computing said x and y axis error signals , $e_x$ and $e_y$, respectively, in accordance with the following equations;

$$e_x = (U_6 - U_5) - (V_1 - V_2)(Y_{sc}/F_2) - (V_3 - V_4)(Y_{td}/F_1) - X_p; \text{ and}$$

$$e_y = (V_1 + V_2) - (V_3 + V_4) + (V_1 - V_2)(X_{sc}/F_2) + (V_3 - V_4)(X_{td}/F_1) - Y_p$$

wherein the variables $V_1$ through $V_4$ are the y axis displacement values from said first, second, fourth and fifth interferometers, respectively, the variables $U_5$ and $U_6$ are the X axis displacement values from said third and sixth interferometers, respectively, the variables $X_{sc}$ and $Y_{sc}$ are the x and y axis components, respectively, of the program displacement of the tool contact point (c) on the workpiece surface contour relative to said reference point (s) in said mounting plate, the variables $X_{td}$ and $Y_{td}$ are the x and y axis components of said predetermined distance from said reference point (t) in said tool holder to a point (d) of the tool cutting edge that contacts said workpiece at said point (c), and the variables $X_p$ and $Y_p$ are said x and y axis components of programmed displacement of said cutting tool.

6. The combination as set forth in claim 5 wherein said metering bar assembly comprises first and second rectangular cross-section optical flats extending along and parallel to the x and y axis slides, respectively, of said machining system, each of said flats having a high optical quality surface thereon forming said reflective reference surfaces along the edges of said flats facing said plurality of interferometers.

7. The combination as set forth in claim 6 wherein said optical flats are formed of a thermally stable ceramic material and further including force isolating support means for supporting said flats on said machining system to minimize the transmission of position-distorting forces to said flats.

* * * * *